Dec. 26, 1961 R. G. PIETY 3,015,085
SEISMIC SIGNAL INTERPRETATION APPARATUS
Filed June 18, 1956 6 Sheets-Sheet 1

INVENTOR.
R. G. PIETY
BY Hudson + Young
ATTORNEYS

Dec. 26, 1961 R. G. PIETY 3,015,085
SEISMIC SIGNAL INTERPRETATION APPARATUS
Filed June 18, 1956 6 Sheets-Sheet 2

INVENTOR.
R. G. PIETY
BY *Hudson & Young*
ATTORNEYS

Dec. 26, 1961 R. G. PIETY 3,015,085
SEISMIC SIGNAL INTERPRETATION APPARATUS
Filed June 18, 1956 6 Sheets-Sheet 3

INVENTOR.
R. G. PIETY
BY Hudson & Young
ATTORNEYS

Dec. 26, 1961 R. G. PIETY 3,015,085
SEISMIC SIGNAL INTERPRETATION APPARATUS
Filed June 18, 1956 6 Sheets-Sheet 4

INVENTOR.
R.G. PIETY
BY Hudson & Young
ATTORNEYS

Dec. 26, 1961  R. G. PIETY  3,015,085
SEISMIC SIGNAL INTERPRETATION APPARATUS
Filed June 18, 1956  6 Sheets-Sheet 5

INVENTOR.
R. G. PIETY
BY *Hudson & Young*
ATTORNEYS

United States Patent Office 3,015,085
Patented Dec. 26, 1961

3,015,085
SEISMIC SIGNAL INTERPRETATION
APPARATUS
Raymond G. Piety, Bartlesville, Okla., assignor to Phillips
Petroleum Company, a corporation of Delaware
Filed June 18, 1956, Ser. No. 592,132
3 Claims. (Cl. 340—15)

This invention relates to the interpretation of seismic records.

Seismic exploration refers to a method of obtaining information regarding subterranean earth formations by transmitting vibrations from a first point at or near the surface of the earth downwardly into the formations and measuring the reflected vibrations at one or more second points spaced from the first point. It is common practice to detonate an explosive charge to produce the vibrations. A plurality of vibration responsive seismometers are disposed in a predetermined geometric array in spaced relationship from the shot hole. The vibrations incident upon the seismometers are converted into corresponding electrical signals which are amplified and recorded. By measuring the travel times of selected vibrations, valuable information can be obtained regarding the depth and slope of subterranean reflecting formations. Unfortunately, extraneous vibrations normally are present which tend to obscure the desired reflected signals. In order to minimize the effect of these extraneous vibrations, a number of systems have been proposed which include electrical filter networks and selected spacings of the seismometers. However, there still exist sections of the country where it is impossible to obtain accurate seismic information.

It has been proposed to combine a plurality of seismic signals from a common shot point so that reflections from a given bed are added. This procedure enables the reflections to be more readily identified because extraneous noise vibrations received at different seismometers tend to occur an random phases and cancel one another to some extent. However, the addition of seismic records from a plurality of locations is complicated by the fact that the reflected vibrations travel different distances to the spaced seismometers. The reflected vibrations thus appear at different points on the recorded signals. This displacement is commonly referred to as "step out" and is caused by both the difference in paths of the reflected vibrations and differences in velocity of travel at various depths. In general, seismic signals travel at higher velocities at lower depths in the earth. In order to add a plurality of seismic signals so that common reflections are superimposed, it becomes necessary to displace the records by different amounts to compensate for reflections from beds at different levels.

In accordance with the present invention, novel apparatus is provided for displacing and superimposing a plurality of seismic signals so that reflections from common beds are superimposed. The measured vibrations are recorded on a medium such as a magnetic tape. The recorded signals from individual seismometers are subsequently re-recorded on a second tape after being delayed a predetermined amount which compensates for angularity of path of the reflected vibrations. The apparatus of this invention is capable of compensating for differences in seismometer locations and differences in travel velocities. In one specific embodiment of this invention the original seismometer signals are recorded on a first magnetic tape, then re-recorded on a second magnetic tape, and finally are combined and recorded on a third magnetic tape. The travel distance of the second tape between the recording and reproducing head is varied continuously to compensate for the angularity of path.

Accordingly, it is an object of this invention to provide improved apparatus for interpreting seismic signals.

Another object is to provide apparatus to reproduce seismic signals with a predetermined amount of delay.

A further object is to provide apparatus for combining and reproducing seismic records in such a manner that reflections from common subterranean formations are added algebraically.

Other objects, advantages and features of this invention should become apparent from the following detailed description, taken in conjunction with the accompanying drawing in which.

Figure 1:
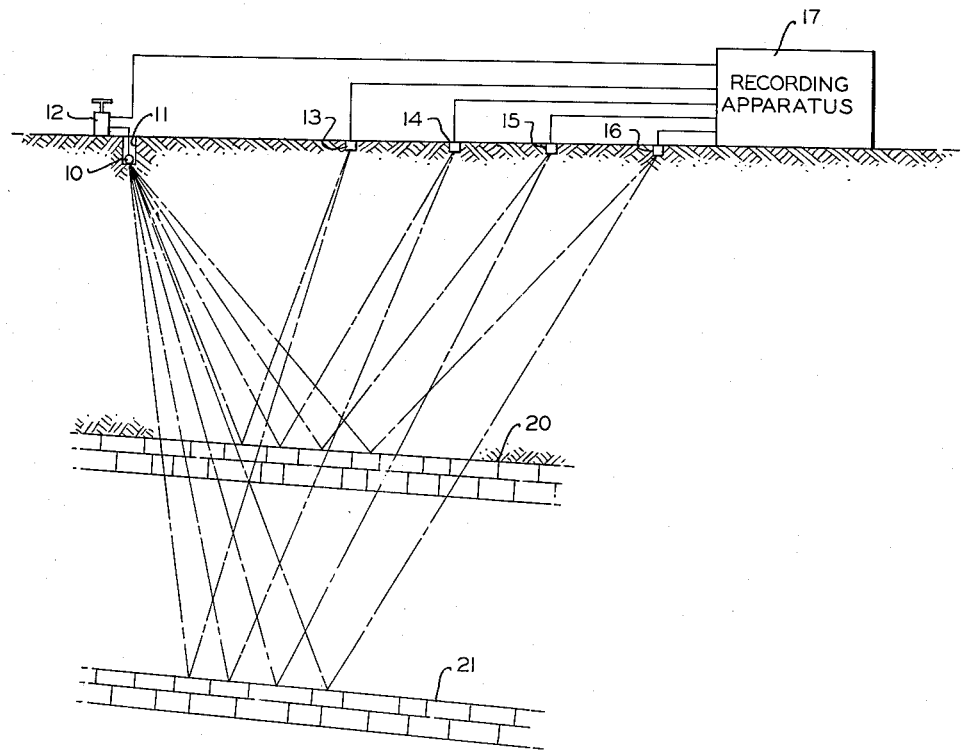
FIGURE 1 is a schematic representation of a typical seismic exploration system.

Referring now to the drawing in detail and to FIGURE 1 in particular, there is shown a schematic representation of apparatus commonly employed in seismic exploration. Vibrations are established at a first point near the surface of the earth by detonating an explosive charge 10 in a shot hole 11. This is accomplished by means of a detonator 12 at the surface. A plurality of seismometers 13, 14, 15 and 16 are positioned near the surface in spaced relationship with shot hole 11. These seismometers can represent individual vibration responsive transducing elements or they can represent a plurality of such elements grouped together, as is conventional in the seismic exploration art. These seismometers are of the type which convert mechanical vibrations incident thereon into corresponding electrical signals. These signals are amplified and recorded by apparatus 17, which can be a conventional magnetic recorder. Vibrations emitted from explosive charge 10 travel downwardly into the earth and are reflected from subterranean formations such as indicated at 20 and 21. The vibrations reflected from these formations are received by the seismometers at the surface. Detonator 12 generates an electrical pulse which is applied to apparatus 17 to indicate on the recorded records the time the initial vibrations are produced.

Figure 2:
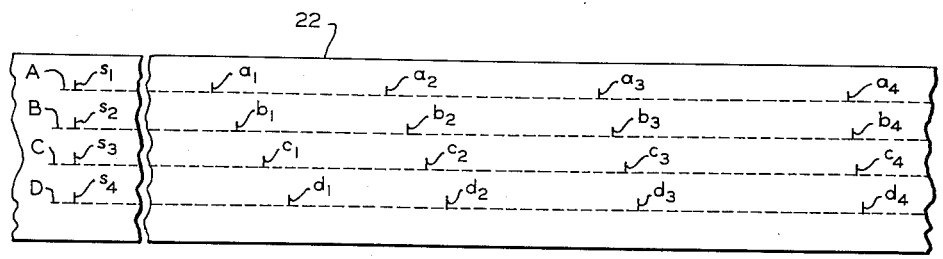
FIGURE 2 is a schematic representation of a typical magnetic recording produced by the recording apparatus of FIGURE 1.

FIGURE 2 is a schematic representation of the recorded signal produced by apparatus 17. The vibrations received by seismometers 13, 14, 15 and 16 are represented schematically by respective channels A, B, C and D of magnetic tape 22. The points $s_1$, $s_2$, $s_3$ and $s_4$ represent the time of detonation of charge 10. Points $a_1$ and $a_2$ on trace A represent reflection from respective formations 20 and 21. Points $a_3$ and $a_4$ represent reflections from lower beds, not shown in FIGURE 1. In similar manner the $b$, $c$ and $d$ points on the tape represent reflections received by respective seismometers 14, 15 and 16. From an inspection of FIGURES 1 and 2 it should be evident that the first reflection received by seismometer 13 arrives at a time earlier than the first reflection received by seismometer 14. This is because the vibrations received by seismometer 14 travel a greater distance than the vibrations received by seismometer 13. However, this difference in time becomes progressively smaller as vibrations are received from greater depths. This is evident because the differences in travel distances become progressively smaller. In order to identify the various reflections in the presence of noise vibrations, it is desired that the several traces A, B, C and D be superimposed in a manner so that the individual reflections are added. This is accomplished by the apparatus of the present invention.

Figure 3:
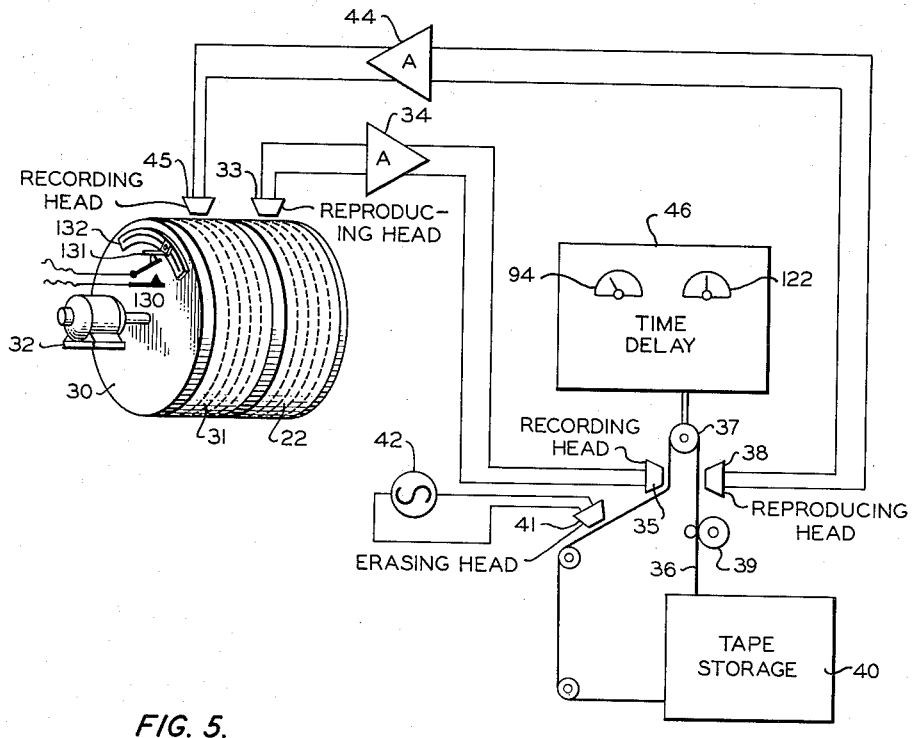
FIGURE 3 is a schematic representation of a first embodiment of the signal transforming apparatus of this invention.

Referring now to FIGURE 3, there is shown a first drum 30 which has tape 22 mounted thereon. Drum 30 also has a second tape 31 mounted thereon. Drum 30 is rotated at a constant speed by a synchronous motor 32. A reproducing head 33 is adapted to be positioned adjacent any one of the traces on tape 22. Reproducing head 33 is connected through an amplifier 34 to a recording head 35 which is mounted adjacent a magnetic tape 36. Tape 36 passes from recording head 35 over an adjustable pulley 37, past a reproducing head 38 and into a storage box 40. A motor drive 39 moves tape 36. The tape is subsequently removed from storage box 40 and passes adjacent an erasing head 41 back past recording head 35. Erasing head 41 can be connected to a source of high frequency alternating current 42 which removes the signal previously recorded on the tape. Reproducing head 38 is connected through an amplifier 44 to a recording head 45 which is adapted to be positioned adjacent any selected channel on magnetic tape 31. Pulley 37 is adapted to be moved upwardly by time delay apparatus 46 so as to vary the travel path of tape 36 between recording head 35 and reproducing head 38. This movement of pulley 37 controls the amount of delay between the time a signal is reproduced from tape 22 and is recorded on tape 31. Each individual channel of tape 22 is recorded on a separate channel of tape 31 by incorporating a proper amount of delay so that reflections from the reflecting beds such as 20 and 21 are recorded side by side on tape 31.

Figure 5:
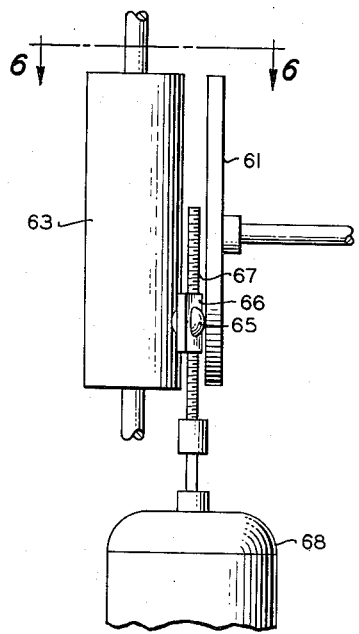
FIGURE 5 is a detailed view of the variable speed drive mechanism employed in the apparatus of FIGURE 4.
Figure 6:
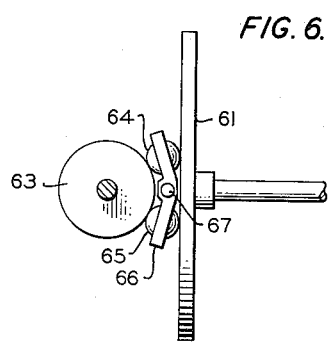
FIGURE 6 is a view taken along line 6—6 in FIGURE 5.
Figure 4:
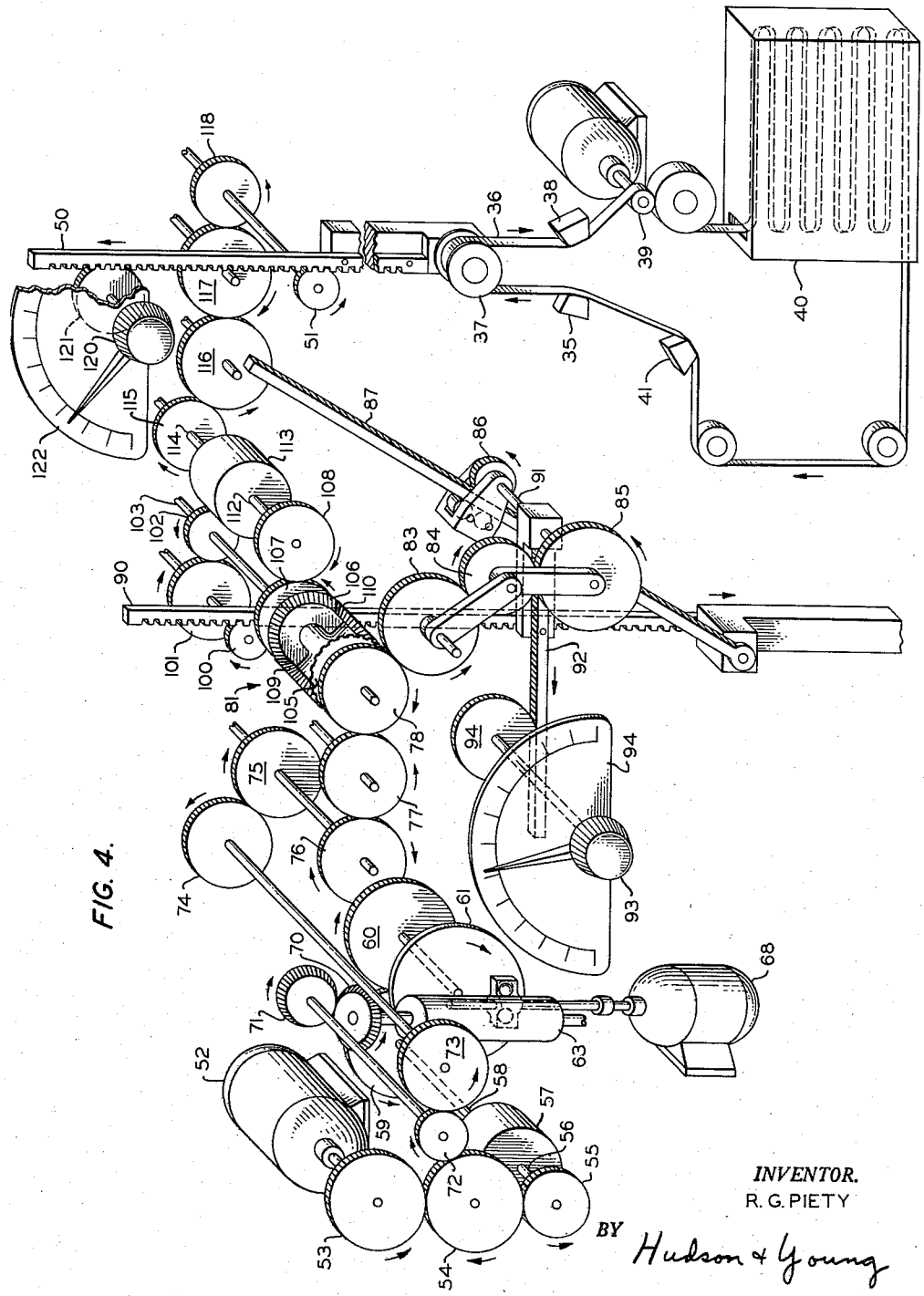
FIGURE 4 is a more detailed schematic view of the time delay apparatus of FIGURE 3.

Delay apparatus 46 is illustrated in detail in FIGURE 4. Pulley 37 is mounted on the lower end of a rack 50 which is positioned by a pinion gear 51. Rotation of pinion gear 51 in the illustrated counterclockwise direction results in pulley 37 being lifted to increase the travel path of tape 36 between recording head 35 and reproducing head 38. The apparatus employed to rotate gear 51 is energized by a constant speed motor 52. The drive shaft of motor 52 is connected by spur gears 53, 54 and 55 to a shaft 56 which has a magnetic clutch 57 thereon. When clutch 57 is energized, shaft 56 is connected to a shaft 58 which is connected by spur gears 59 and 60 to a rotatable disc 61. Disc 61 cooperates with a drum 63 to form a variable speed drive mechanism. This apparatus is illustrated in greater detail in FIGURES 5 and 6. Motion is transmitted from disc 61 to drum 63 by a pair of balls 64 and 65 which are positioned therebetween and mounted in a frame 66. Frame 66 is threaded to a shaft 67 which is connected to the drive shaft of a motor 68. Rotation of motor 68 in a first direction results in frame 66 being moved toward the periphery of disc 61. It should be evident that the speed of rotation of drum 63 increases as frame 66 is moved closer to the periphery of disc 61. The speed of rotation of drum 63 can thus be increased progressively at a rate which depends upon the speed of rotation of motor 68.

Drum 63 is connected through bevel gears 70 and 71 and spur gears 72, 73, 74, 75, 76, 77 and 78 to the first input bevel gear 105 of a differential 81. Gear 78 is also connected through spur gears 83, 84 and 85 to rotate a pinion 86 which drives a rack 87. Rack 87 is pivotally attached at its lower end to a rack 90. Rack 90 is constrained by guides, not shown, so as to move in a generally vertical position when the apparatus is positioned as illustrated.

Gear 85 and pinion 86 are mounted on a shaft 91 which is attached to a horizontal rack 92 that is constrained for movement in a horizontal direction by suitable guides, not shown. The initial position of rack 92 is established by a horizontal time setting knob 93 which rotates a pinion 94 to drive rack 92. The position of knob 93 is indicated by a calibrated scale 94. Gears 83, 84 and 85 are connected together by a flexible linkage so that pinion 86 is rotated irrespective of the position of rack 92.

Movement of rack 90 in a vertical direction results in rotation of a pinion 100 which meshes with rack 90. Pinion 100 is connected by spur gears 101 and 102 to an input drive shaft 103 of differential 81.

Figure 7:
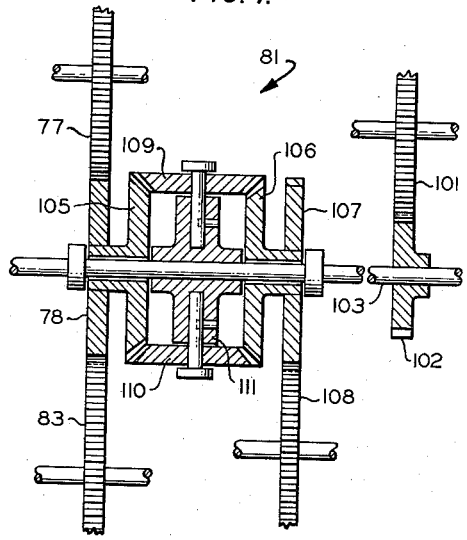
FIGURE 7 is a detailed view of the differential gear mechanism employed in the apparatus of FIGURE 4.

Differential 81 is illustrated in detail in FIGURE 7. This differential comprises a first bevel gear 105 which rotates with gear 78. A second bevel gear 106 is mounted opposite gear 105 and rotates with an output bevel gear 107 which meshes with a bevel gear 108. A pair of bevel gears 109 and 110 are mounted opposite one another by a rotatable hub 111. Hub 111 is secured to input drive shaft 103. The operation of differential 81 is described in detail hereinafter.

Spur gear 108 is connected by a shaft 112 (FIGURE 4) to a second magnetic clutch 113. When clutch 113 is energized shaft 112 is connected to a second shaft 114. Shaft 114 is connected by spur gears 115, 116, 117 and 118 to pinion 51 which drives rack 50. Rack 50 can be positioned initially by rotation of a knob 120 which is connected to a pinion 121 that meshes with rack 50. The position of knob 120 is indicated by a scale 122.

Figure 9:
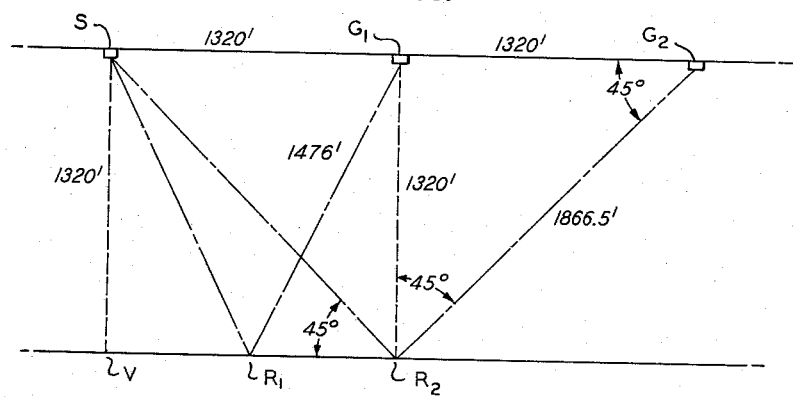
FIGURE 9 is a schematic representation of the operating principles of the apparatus of FIGURE 4.

The operation of the time delay apparatus of this invention can be explained in conjunction with FIGURE 9. Reference character S represents the shot point at the surface of the earth. Reference characters $G_1$ and $G_2$ can represent the locations of seismometers 13 and 16, for example. For purposes of discussion it is assumed that point $G_1$ is 1320 feet from point S and point $G_2$ is 1320 feet from point $G_1$. It is also assumed that a reflecting bed occurs at a depth of 1320 feet. This results in the reflections from point S to point $G_1$ striking a point $R_2$ on the reflecting bed such that the incident and reflected vibrations make angles of 45° with the reflecting bed. The location of the reflecting bed is merely an arbitrary assumption because it has been found that satisfactory corrections can be obtained if such an initial angle of 45° is assumed. It is also assumed for purposes of discussion that the vibrations are transmitted at a velocity of 10,000 feet per second in the region above the illustrated reflecting bed. Under this assumption, vibrations travel horizontally through the earth from point S to point $G_2$ at a velocity of 10,000 feet per second so that the initial vibrations received at point $G_2$ occur 0.264 second after detonation of an explosive charge at point S. Scale 94 of FIGURE 4 is calibrated so that this time is set by rotating dial 93. This results in rack 92 being positioned so that rack 87 makes an angle of 45° with vertical rack 90. This corresponds to angle $G_1R_2G_2$ in FIGURE 9. The time for the reflected wave to arrive at point $G_2$ is equal to the distance $SR_2G_2$ divided by the velocity, or 0.373 second. The time for reflection to travel from point S vertically to the reflecting bed at point V and return is equal to twice the depth of the bed divided by the velocity, or 0.264 second. The correction for the angularity of path is thus equal to the difference between these two times, which is 0.109 second. This value is established by rotating dial 120 in FIGURE 4. From an inspection of FIGURE 4 it can be seen that a certain amount of time is required for tape 36 to travel between heads 35 and 38 even when rack 50 is positioned at its lowermost point. It will be assumed that this time is equal to 0.5 second. The setting of dial 120 is equal to the difference between 0.5 second and 0.109 second, or 0.391 second.

It is desired that the apparatus of FIGURE 4 be set in motion at the time a reflection from the illustrated reflecting bed of FIGURE 9 arrives at point $G_2$. As previously mentioned, this time occurs 0.373 second after detonation of the explosive charge. Initially, clutches 57 and 113 are deenergized so that no rotation is imparted to the racks. In FIGURE 3 there is illustrated a schematic arrangement of switching apparatus which can be employed to energize clutches 57 and 113. This mechanism comprises a stationary contact 130 which is mounted adjacent drum 30. A switch 131 is adjustably mounted in a frame 132 on drum 30 so as to engage contact 130 when drum 30 is rotated. Switch 131 is adjusted initially so that contact 130 is engaged at 0.373 second following the point $s_4$ on tape 22. Switch 131 is the type which locks in a closed position.

Figure 8:
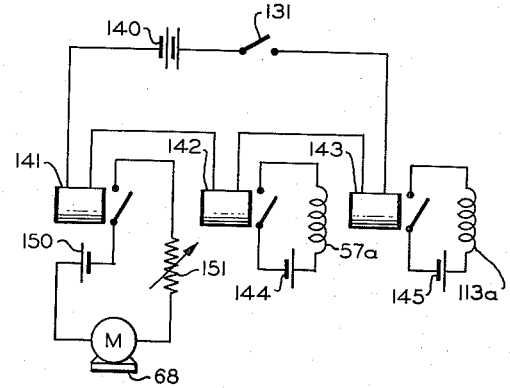
FIGURE 8 is a schematic circuit diagram of electrical equipment employed to operate the apparatus of FIGURE 4.

As illustrated in FIGURE 8, switch 131 is connected in circuit with a current source 140 and the coils of three relays 141, 142 and 143. The switch of relay 142 is connected in circuit with a current source 144 and a coil 57a which energizes magnetic clutch 57. The switch of relay 143 is connected in circuit with a current source 145 and a coil 113a which energizes clutch 113. Closure of switch 131 thus results in the two clutches being energized so that motion is transmitted from motor 52 to the two rack assemblies.

Rotation of motor 52 is imparted through the illustrated gear train to the input gear 105 of differential 81. Rotation of motor 52 is also imparted through the gear train to drive rack 87 downwardly. This movement of rack 87 results in rack 90 being moved downwardly so that the angle between the two racks is decreased. Movement of rack 90 imparts a rotation to the second input of differential 81, which comprises connected bevel gears 109 and 110. The output of the differential, which is represented by gear 107, is equal to the difference between the two inputs, which in effect is equal to the difference between the movement of racks 87 and 90. The output of the differential is applied through the illustrated gear train to move rack 50 upwardly to increase the time delay between recording head 35 and reproducing head 38. As rack 87 moves downwardly, the angle between rack 87 and rack 90 is diminished and gradually approaches zero. This reduction in angle diminishes the output of the differential so that the differential output finally becomes zero when the angle between the two racks becomes zero. At this time, no additional delay is added to tape 36. From an inspection of FIGURE 1 it should be evident that the correction for angularity of path decreases as reflections are received from progressively lower beds. This is illustrated by the record of FIGURE 2 wherein it can be seen that the reflections from the spaced beds approach one another as the depths of the reflecting beds increase. The overall gear ratios are selected such that the output rotation of the differential is a direct function of the relative lengths of racks 87 and 90 beneath rack 92. Obviously the actual number of gears and the individual gear ratios in the trains are largely a matter of design convenience.

After magnetic tape trace D has been corrected in the manner described, corresponding corrections are made for each of the other traces. In order to correct trace A, for example, reproducing head 33 in FIGURE 3 is moved adjacent trace A on tape 22 and recording head 45 is moved to a corresponding channel of tape 31. The foregoing procedure is then repeated. In order to make the correction for trace A, which represents the reflections received at point $G_1$ in FIGURE 9, the horizontal time setting of dial 93 is set equal to the distance 1320 feet divided by the velocity of 10,000 feet per second, or 0.132 second. Arm 131 of FIGURE 3 is set to actuate switch 130 at a time which is obtained by dividing twice the distance $R_1$, $G_1$ by the velocity, which is equal to 0.295 second. The correction for angularity of path is the difference between the reflected time and the reflected time in a vertical direction, which is equal to 0.031 second. Dial 120 is then set at the difference between 0.5 and 0.031, or 0.469 second. The apparatus is then ready to be operated to correct trace A.

In the foregoing description it has been assumed that there is no change in velocity of the seismic waves at depths lower than the illustrated reflecting bed of FIGURE 9. In actual practice the vibrations travel progressively faster at lower depths. This change is corrected for by varying the speed of rotation of gear 78. Such a change in speed is accomplished by rotating motor 68 so that frame 66 moves outwardly toward the periphery of disc 61. This increases the speed at which drum 63 is rotated. Motor 68 is connected in circuit with the switch of relay 141 of FIGURE 8, a current source 150 and a variable resistor 151. The setting of resistor 151 determines the speed at which motor 68 is rotated to increase the velocity transmitted through the disc and drum assembly. The setting of resistor 151 is determined from a knowledge of the increased velocity of the seismic waves at progressively lower depths. This velocity curve is obtained by procedures well known to those skilled in the seismic art. For example, a plurality of explosive charges can be detonated in progressively greater depths in a test well and the times at which the vibrations are received at the surface measured. Resistor 151 is adjusted so that the speed of rotation of gear 79 is increased as a direct function of the increased velocity of the seismic waves at progressively lower depths.

Figure 10:
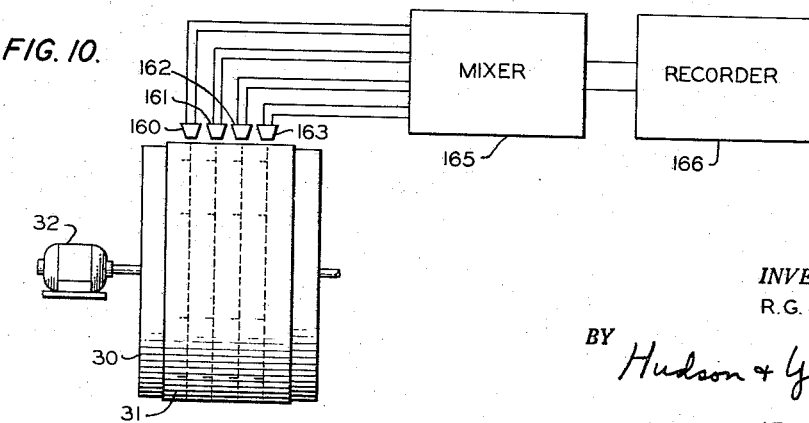
FIGURE 10 is a schematic representation of a signal reproducing system.

The records produced on tape 31 are thus adjusted so that the reflections from the various beds are located side by side. These records are then reproduced and combined so that the desired reflections are added in phase with one another. It is assumed that the extraneous noise vibrations occur randomly and tend to cancel one another. A suitable reproducing system is illustrated schematically in FIGURE 10. Four reproducing heads 160, 161, 162 and 163 are positioned adjacent the four traces on tape 31. These four reproducing heads are connected to the inputs of a mixer 165, and the output of mixer 165 is connected to the input of a recorder 166. This produces a composite record wherein the amplitudes of the four traces are added.

Figure 11:
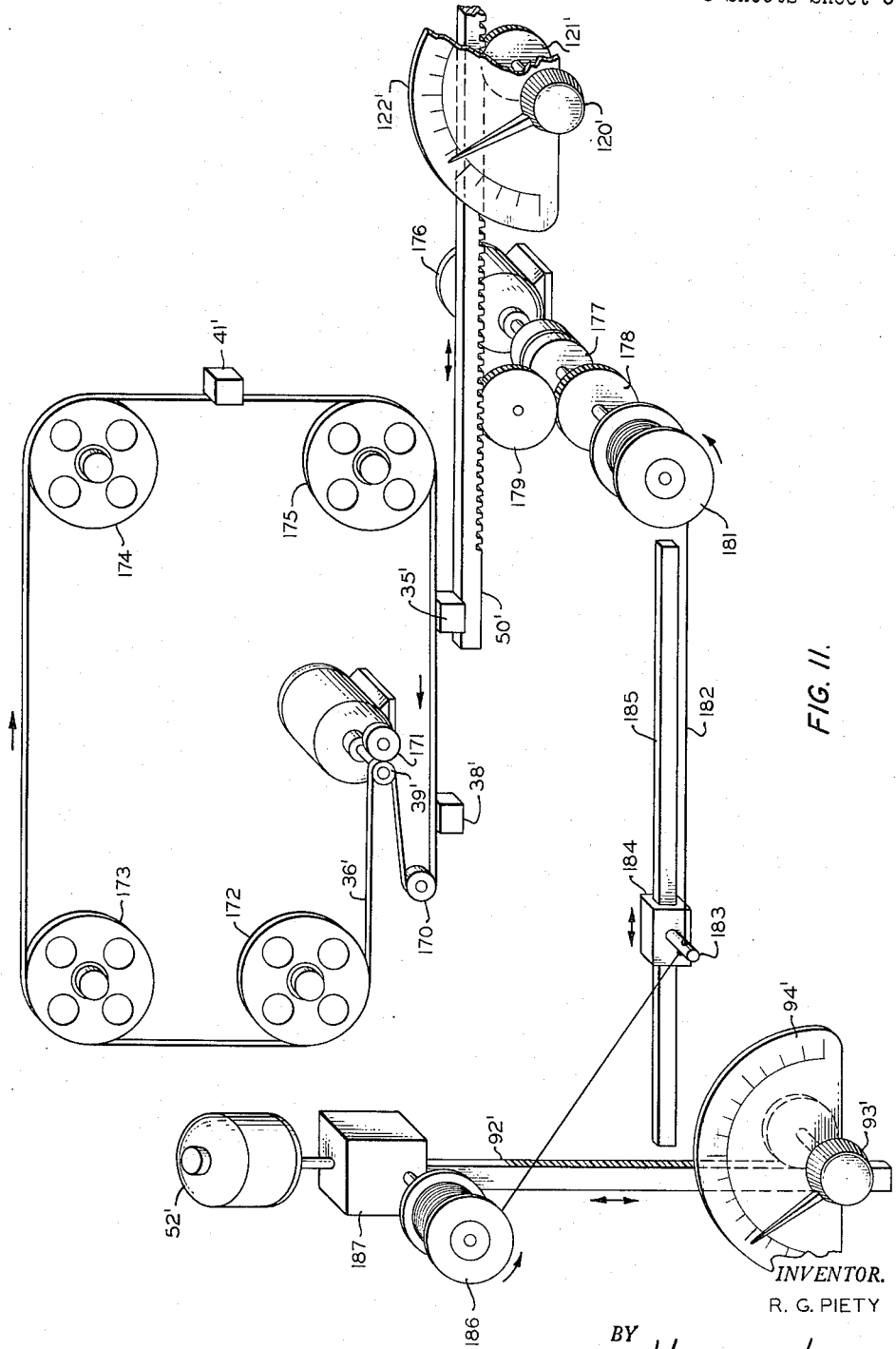
FIGURE 11 is a schematic representation of a second embodiment of the signal transforming apparatus of this invention.

In FIGURE 11 there is shown a second embodiment of the signal transforming apparatus. Elements of FIGURE 11 which correspond to elements of FIGURE 4 are designated by like primed reference numerals. Tape 36' is moved by tape drive wheel 39' past recording head 35', reproducing head 38', guide wheels 170, 171, 172 and 173, erasing head 41' and guide wheel 175. Recording head 35' is mounted on a rack 50' which is positioned initially by a dial 120'. A motor 176 is connected through a clutch 177 and gears 178 and 179 to rack 50'. This motor normally rotates in a direction to tend to move rack 50' to the right. A reel 181 is mounted on the same shaft with gear 178. A cable 182 extends from reel 181 to a pin 183 which is attached to a frame member 184 that is free to move longitudinally of a guide bar 185. Cable 182 extends from pin 183 to a second reel 186. Reel 186 is rotated by a motor 52' through a speed reducer box 187. Box 187 is attached to a rack 92' which is positioned initially by a dial 93'.

Dial 93' is rotated to position reel 186 vertically in accordance with the horizontal spacing between the shot point and seismometer. Dial 120' is rotated to position head 35' from head 38' in accordance with the desired initial delay. These dials correspond to respective dials 93 and 120 of FIGURE 4. Reel 186 is then rotated to unwind cable 182. Box 187 can be replaced by the variable speed drive of FIGURE 4, if desired. As cable 182 is unwound from reel 186, pin 183 moves to the right as reel 181 takes up the cable. Reel 181 always tends to be rotated through clutch 177 so as to take up cable whenever possible. Rotation of reel 181 moves rack 50' to the right to increase the spacing between heads 38' and 35'. This increases the delay in the recorded signal. The angle formed by the two portions of cable 182 corresponds in function to the angle between racks 87 and 90 of FIGURE 4. As pin 183 moves toward the right, reel 181 rotates progressively faster, assuming a constant speed of rotation of reel 186. If the seismometers are located on a surface that is inclined to the reflecting beds, the apparatus of FIGURE 11 can be modified to make such a correction. Guide bar 185 is positoined to make an angle other than 90° with rack 92'. Rack 92' is considered to be parallel to the average ground surface. Guide bar 185 is positioned to be representative of a direction perpendicular to the reflecting beds. The other figures can similarly be modified to make such corrections.

Figure 12:
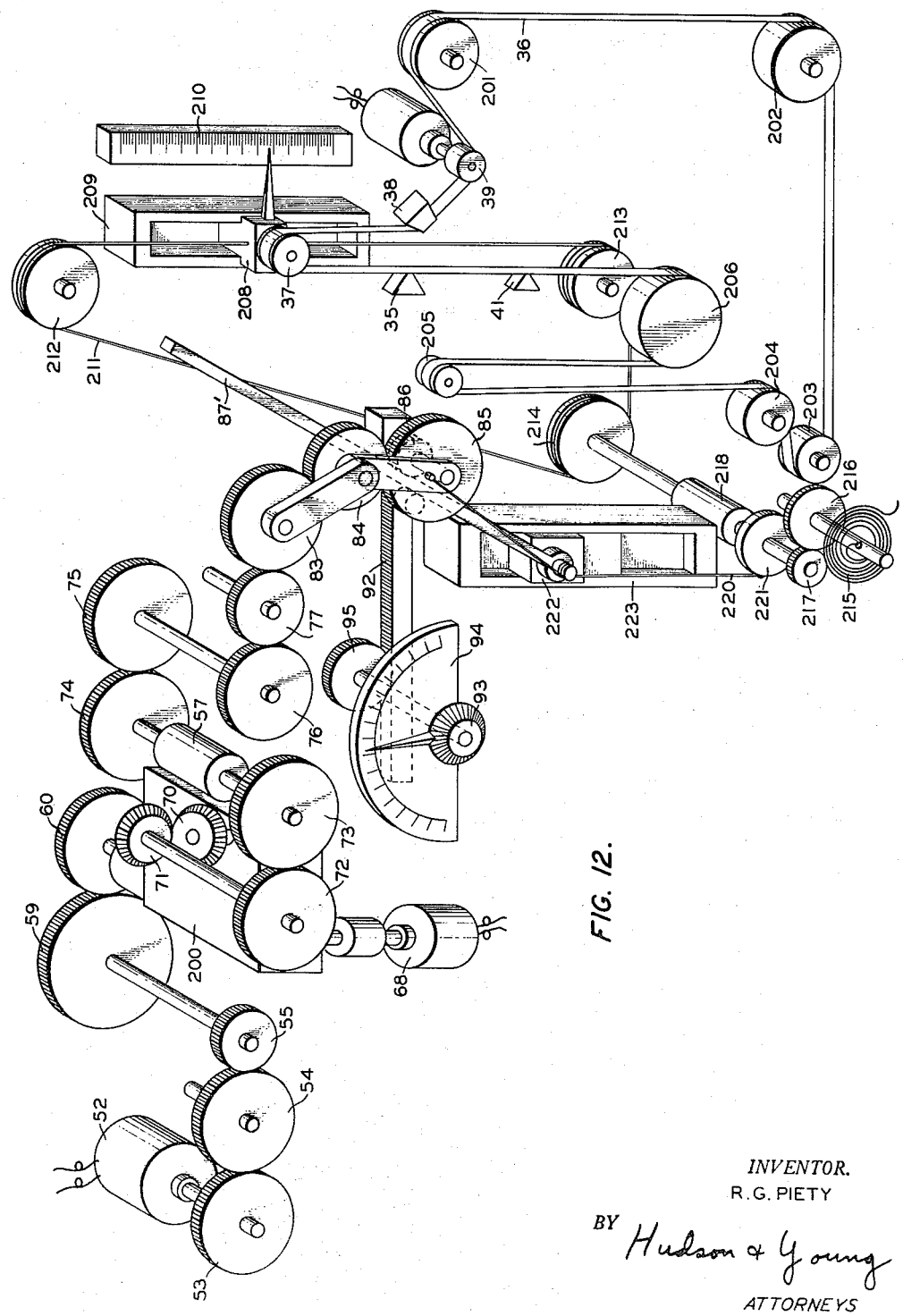
FIGURE 12 is a schematic representation of an additional embodiment of the invention.

In FIGURE 12, there is shown still another embodiment of the invention which incorporates features of FIGURES 4 and 11. Tape 36 passes around guide wheels 201, 202, 203, 204 and 205. A free pulley 206 maintains tension on the tape. Pulley 37 is attached to a bar 208 which moves in a frame 209. A scale 210 is provided to indicate the position of bar 208. A cord 211 is attached to bar 208 and extends around wheels 212, 213 and 214 to form a closed loop. A coiled spring 215 is connected through gears 216 and 217 and a coupling 218 to wheel 214. Spring 215 normally tends to rotate wheel 214 to raise bar 208. This motion is opposed by a cord 220 which extends from a pulley 221 to a bar 222, the latter being free to move in a frame 223. Bar 222 is moved downwardly by rotation of gear 86. The drive mechanism for gear 86 is generally similar to that shown in FIGURE 4, and corresponding elements are designated by like reference numerals. Box 200 represents a variable speed drive, which can be a gearing arrangement, or of the form shown in FIGURE 4.

Motor 52 thus actuates the gearing mechanism to drive rod 87' downwardly. This permits spring 215 to rotate wheel 214 to move bar 208 upwardly thereby increasing the tape length between heads 35 and 38. The net result is the same as in FIGURES 4 and 11.

While the invention has been described in conjunction with present preferred embodiments, it should be evident that it is not limited thereto.

What is claimed is:

1. Apparatus for use in interpreting seismic signals comprising a recording medium, a recording head and a reproducing head spaced from one another adjacent said recording medium, means to move said recording medium relative to said heads from said recording head to said reproducing head, a member constrained for movement in a first direction, a first cable attached at one end to said member, a first reel having the second end of said first cable attached thereto, means tending to rotate said first reel to wind said first cable thereon so as to move said member in said first direction, a second reel, a second cable extending from said member to said second reel, means to rotate said second reel in a direction to unwind said second cable therefrom to permit movement of said member in said first direction in response to said first cable being wound on said first reel, and means responsive to rotation of said first reel to vary the effective spacing between said recording and reproducing heads.

2. The combination in accordance with claim 1 further comprising means to position said second reel relative to said member so that said first and second cables initially make a predetermined angle with one another.

3. Apparatus for use in interpreting seismic signals comprising a magnetic tape recording medium; a recording head and a reproducing head spaced from one another along said medium; means to move said medium from said recording head to said reproducing head; a member constrained for movement in a first direction; a first reel; a first cable having one end attached to said member and the other end attached to said first reel; a second reel; a second cable having one end attached to said member and the other end attached to said second reel; means to rotate said first reel to unwind said first cable therefrom; means to rotate said second reel to wind said second cable thereon while said first reel is rotating, to maintain said first and second cables taut while so winding, and to vary the spacing of said recording head from said reproducing head along said medium at a rate proportional to the rate at which said second cable is wound on said second reel.

References Cited in the file of this patent

UNITED STATES PATENTS

| | | |
|---|---|---|
| 2,101,408 | Muzzey | Dec. 7, 1937 |
| 2,604,955 | Hawkins | July 29, 1952 |
| 2,620,890 | Lee | Dec. 9, 1952 |
| 2,672,944 | Minton | Mar. 23, 1954 |
| 2,683,254 | Anderson | July 6, 1954 |
| 2,684,468 | McClure | July 20, 1954 |
| 2,690,913 | Rabinow | Oct. 5, 1954 |
| 2,732,025 | Lee | Jan. 24, 1956 |
| 2,765,455 | Meiners | Oct. 2, 1956 |
| 2,832,841 | Eldridge | Apr. 29, 1958 |
| 2,838,743 | Fredriksson | June 10, 1958 |
| 2,841,777 | Blake | July 1, 1958 |
| 2,861,507 | Palmer | Nov. 25, 1958 |
| 2,879,860 | Tilley | Mar. 31, 1959 |